United States Patent [19]

Ebbers

[11] Patent Number: 5,119,477
[45] Date of Patent: Jun. 2, 1992

[54] MEMORY MANAGER FOR HIERARCHICAL GRAPHIC STRUCTURES

[75] Inventor: Timothy J. Ebbers, Shokan, N.Y.

[73] Assignee: International Business Machines Corporation, Armonk, N.Y.

[21] Appl. No.: 425,764

[22] Filed: Oct. 23, 1989

[51] Int. Cl.⁵ .............................................. G06F 3/153
[52] U.S. Cl. .................................................... 395/160
[58] Field of Search ... 364/200 MS File, 900 MS File, 364/521; 395/160

[56] References Cited

U.S. PATENT DOCUMENTS

| | | | |
|---|---|---|---|
| 4,139,838 | 2/1979 | Inose et al. | 364/900 X |
| 4,433,377 | 2/1984 | Eustit et al. | 364/200 |
| 4,794,389 | 12/1988 | Luck et al. | 340/723 |

Primary Examiner—Thomas M. Heckler
Attorney, Agent, or Firm—William A. Kinnaman, Jr.; Mark S. Walker

[57] ABSTRACT

Video random access memory having a random array and serial buffer is employed to speed the replication of structure state information used in the processing of hierarchical graphic data structures. Specialized circuitry in the video RAM and associated VRAM sequencer are used to perform a rapid transfer of structure state information from one row of the VRAM (the parent row) to a second VRAM row (the child row). The VRAM sequencer is modified to perform back to back read data transfer and write data transfer operation in response to a single graphics processor command. The return to previous structure state can be accomplished by readdressing the VRAM row containing the previous structure state.

6 Claims, 4 Drawing Sheets

MEMORY MANAGER FOR HIERARCHICAL GRAPHIC STRUCTURES

BACKGROUND OF THE INVENTION

1. Field of the Invention

The present invention is related to information handling systems for displaying graphics images on raster display devices and more particularly to graphics display systems for generating and displaying images based upon hierarchical graphics data structures. This invention more particularly relates to apparatus and methods for managing memory in a graphics display system for displaying hierarchical data structures.

2. Background of the Invention

Graphics display systems are designed to interpret graphics commands issued by an application program to create a graphics image for display on a display device. Early graphics display systems each had unique interfaces and the application programs were required to recognize and program to those unique interfaces. More recently several graphics interface standards have evolved. For example, a Graphics Kernel Standard (GKS), Programmer's Hierarchical Interactive Graphics Systems (PHIGS) and CGI each provide a standard method for linking applications programs and graphics systems. A consistent interface frees the application program of the burden of developing multiple and different interfaces to various hardware systems. The application programmer can therefore focus more attention on providing features and performance in his specific graphics application.

Several recent graphics standards use multi-level or hierarchical databases to contain the graphics models. This powerful concept minimizes data replication in graphics models and facilitates interactive modification and transformation of data. Graphics structures or models can be defined once and then referenced as many times as necessary to create the final object.

The basic building block of the hierarchical graphics interface is the structure. The structures contain graphics elements such as drawing primitives (e.g., lines, characters, polygons), attribute selections (color), modelling transformations, labels, and viewing selections. Structures specify the sequence of elements that, when processed, generate a specific effect on the screen. In a hierarchical graphics environment, structures execute other structures which, in turn, can execute other structures. This creates a tree-like hierarchy where primitive structures can be repeatedly used throughout the drawing operation. Graphics scenes are created by traversing the structure tree and proceeding down through various levels of structure as defined in the hierarchical database.

FIG. 1 illustrates the structure hierarchy. Structure A 100 is composed of several primitives or drawing commands 102-114. Each of these primitives or commands is executed in order from left to right. The structure hierarchy is created through the use of "structure" commands. For example, command 106 directs the execution or inclusion of structure B at that point. Structure B(116) contains drawing primitives 118-124. Structure B may, in turn, request another structure, for example structure D(126), containing further drawing primitives. Upon the completion of all drawing primitives of structure D(126), control returns to the "structure" command 124. Since no further drawing primitives exist in structure B(116) control is returned to structure A to the command following "structure" command 106, i.e., 108. 108 in turn executes structure C (130). Structure E 132 is executed by structure C. As shown by command 114 structure C may be repetitively executed and included in different parts of the hierarchy.

The called or "child" structure inherits the attributes of the "parent" structure during the execute structure operation. The newly formed child structure continues to execute until it encounters another structure command or until it completes its list of display primitives or commands. When control is returned to the parent structure the previous parent structure state is returned and processing continues for the remaining structure elements. Thus the following actions occur when a "structure" command is encountered in a parent structure:

traversal of the parent structure is suspended
the values of the parent structure are saved
the child structure is traversed and completed
the child structure returns control to the parent structure
the parent structure state values are restored
the parent structure traversal resumes.

Hierarchical graphic interfaces require that the entire state of the graphics context be saved when the structure call is initiated. The size of the graphic state can be 512 to 1024 32-bit words. A graphics processor must replicate the state in order to give the child structure the same attributes as the parent structure and must save the state for resumption of execution when the child structure is completed.

A standard 32-bit processor can perform the transfer using a read/write copy loop to transfer the structure state. A structure size of 512 entries being copied through a typical copy loop of 0.25-0.5 microseconds per iteration would require 128-256 microseconds to complete. Larger structures or slower processors would take considerably longer. The speed of the replication frequently becomes a major bottleneck in the ability of a graphics processor to efficiently execute a hierarchical graphics model.

SUMMARY OF THE INVENTION

The present invention is directed to providing apparatus and methods to speed structure state storage, replication, and recall. It is an object of the present invention to provide an apparatus and method to reduce the overhead required to transfer the structure state to memory and to replicate the structure state for child processing.

It is a further object of the present invention to provide a memory structure for state storage that simplifies the process of saving and recalling the memory structure.

These and other objects of the invention will become apparent through the Detailed Description of the Preferred Embodiment.

DETAILED DESCRIPTION OF THE PREFERRED EMBODIMENT

Figure 1:
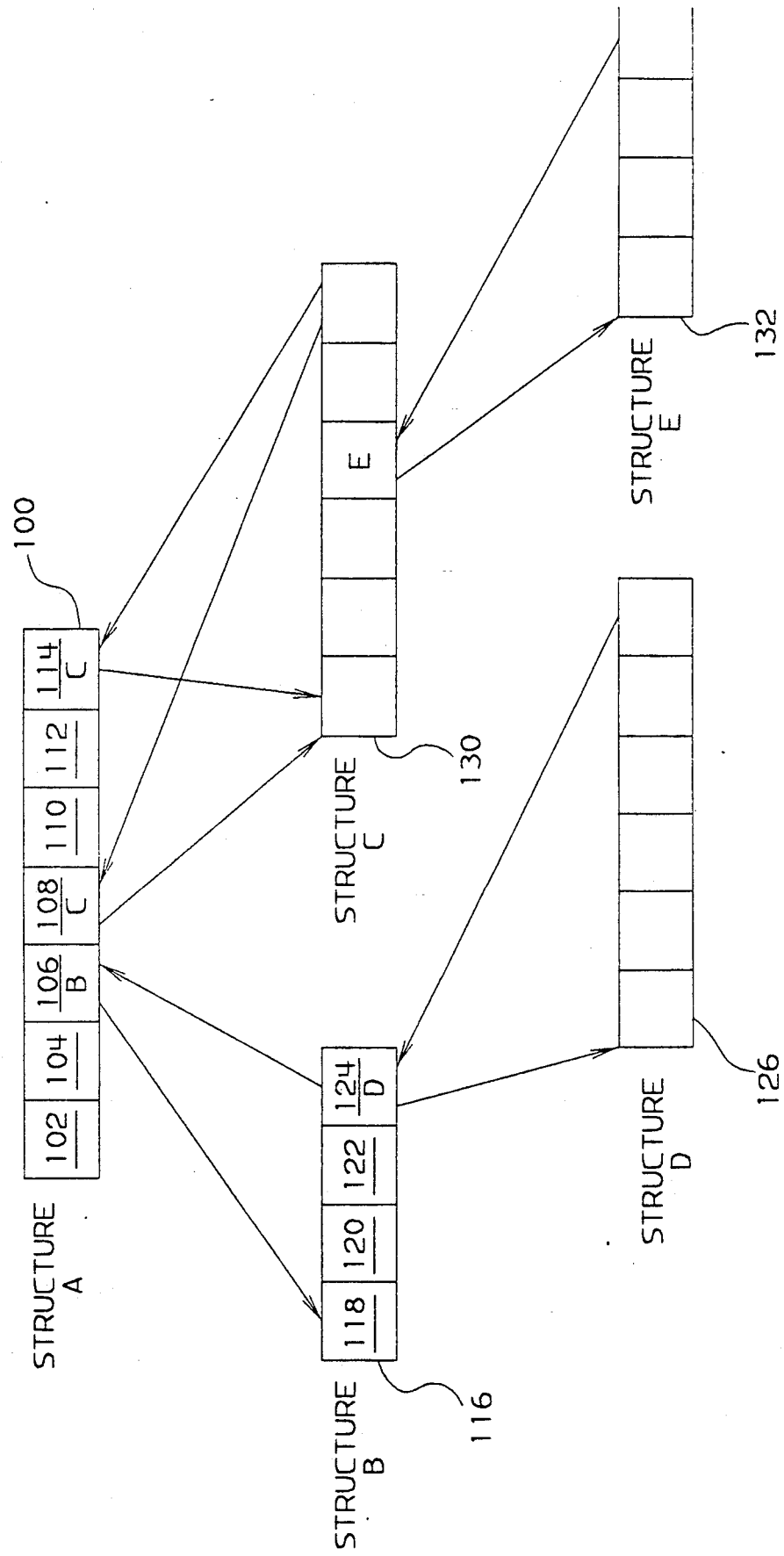
FIG. 1 is an illustration of the relationships between structures in a hierarchical graphics database.
Figure 2:
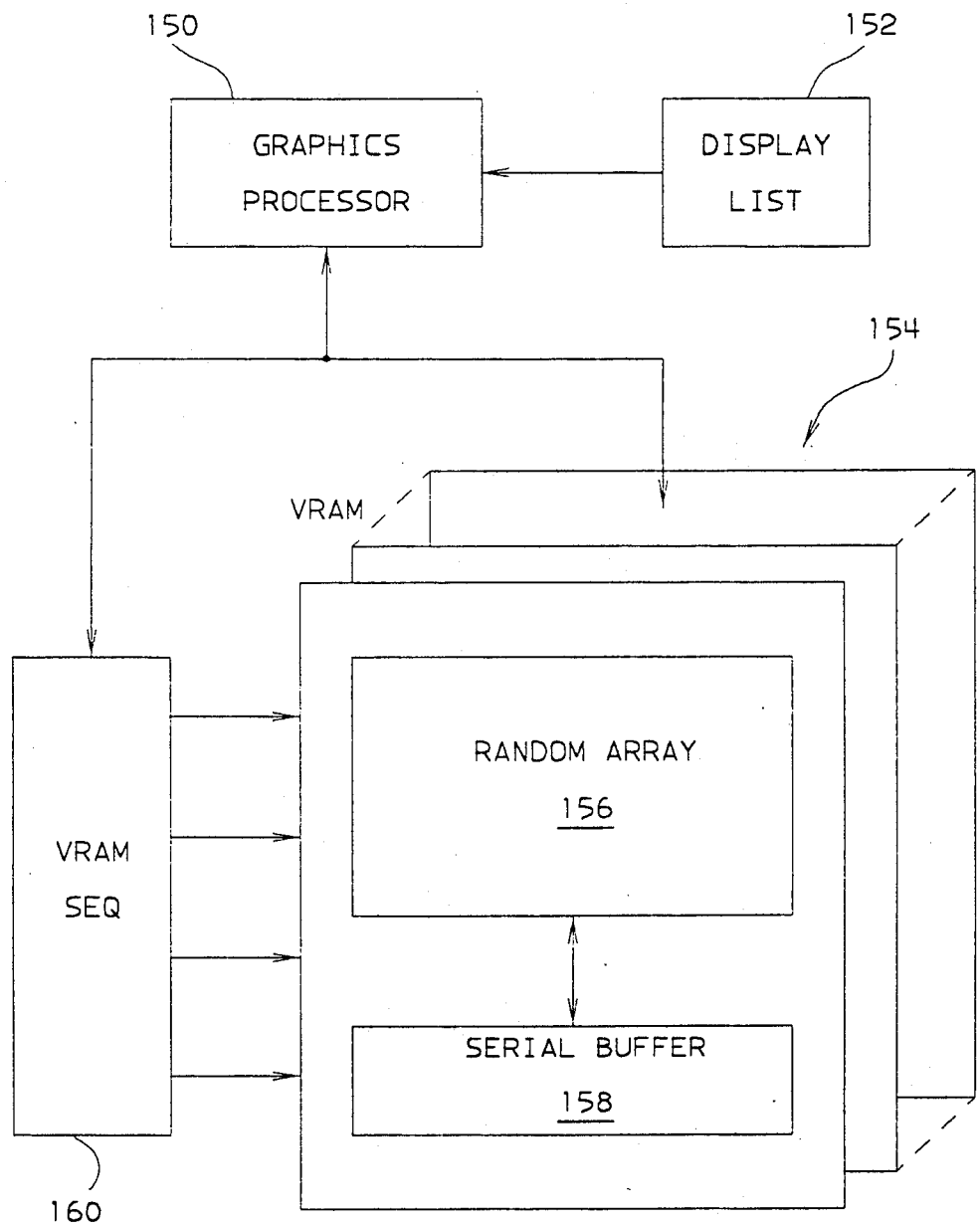
FIG. 2 is a block diagram showing a portion of the graphics display system employing the present invention.

A portion of a graphics display system employing the present invention is shown in FIG. 2. The graphics processor 150 decodes and executes graphics orders received from a display list 152. Some of these orders involve generating graphic primitives (line, characters and polygons), on the display. Other orders modify the attributes of these primitives (color, line style, and texture) or the modelling transformation of the graphics environment (view transformation matrices, clipping windows, view mapping windows, etc.). These attributes and modelling transformations make up the structure state and must be passed to child structures as the hierarchical structure tree is traversed.

Video RAM (VRAM) 154 stores the structure state for parent and child processes. A video RAM is a specialized form of dynamic random access memory. Each video RAM contains two input/output ports, one for random access and one for serial access, and a single address port. Internally each VRAM contains a random array 156 addressable like standard random access memory and a serial buffer 158. The random array allows addressing of any memory cell within the array. Like dynamic RAM, the random array of a VRAM is divided into rows and columns. For example, a 1M bit VRAM typically contains 512 rows and 512 columns per row. Each memory cell contains 4 bits of data. Multiple VRAMs are arranged with a depth to provide a 32-bit interface to the graphics processor.

The serial buffer 158 is designed to sequentially shift the contents of its buffer to the screen. Serial buffer 158 is filled by executing a special memory cycle called "read data transfer" that copies an entire row of the VRAM into the serial buffer. External controls allow the data to be sequentially clocked out of the serial buffer into circuitry that updates the screen. Video RAMs frequently also contain a "write data transfer" memory cycle that copies the serial buffer into a selected row in the random access memory. The present invention employs a video RAM with both "read data transfer" and "write data transfer" cycles.

VRAM sequencer 160 controls the memory cycles of the VRAM array and manages the VRAM control lines, e.g., RAS (row address select), CAS (column address select), WE (write enable), OE (output enable), during the memory cycles. The sequencer also generates refresh cycles when needed. The sequencer contains specialized sequences to perform read data transfer and write data transfer operations in the VRAM.

The present invention implements structure state storage by using the above described row transfer features of the VRAM. Structure state information is stored in integral rows in the VRAM random access array 156. The structure state can be stored in adjacent rows if more than one row is required to store the full description of the structure. The execution of an "execute structure" command requires that the structure state be replicated for the child structure. The VRAM technology allows rapid copying of the one or more rows containing the structure state information. The use of a read data transfer and write data transfer operation allows a memory controlled process to first copy the state structure to the serial buffer and then to a new row address for the child structure. Graphics processor 150 does not participate in the actual copying operation; it is accomplished by the VRAM sequencer.

Figure 3:
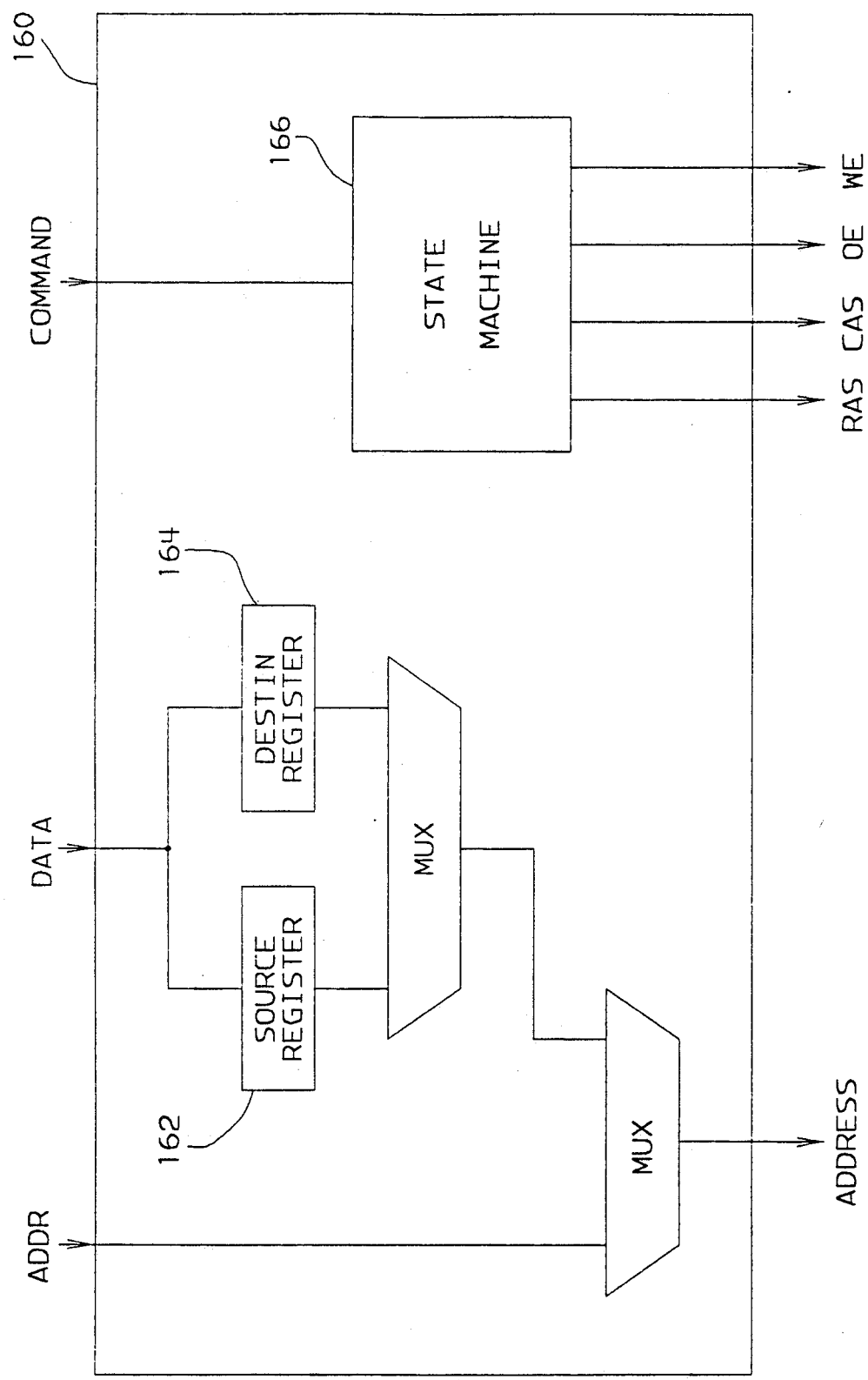
FIG. 3 is a block diagram showing the detail of a VRAM sequencer according to the present invention.

VRAM sequencer 160 is shown in additional detail in FIG. 3. Source register 162 contains the row address for the parent structure while destination register 164 contains the row address for the child structure. Graphics processor 150 will issue a command to transfer the data to the VRAM sequencer. The sequencer uses source row register 162 to address the random array and perform a read transfer operation to copy the contents of the parent structure state row into the internal serial buffer 158 of the VRAM. This step is immediately followed by a write data transfer operation using the destination register to designate the random array row address for the child structure causing the data from serial buffer 158 to be copied to child buffer structure row in random array 156.

Figure 4:
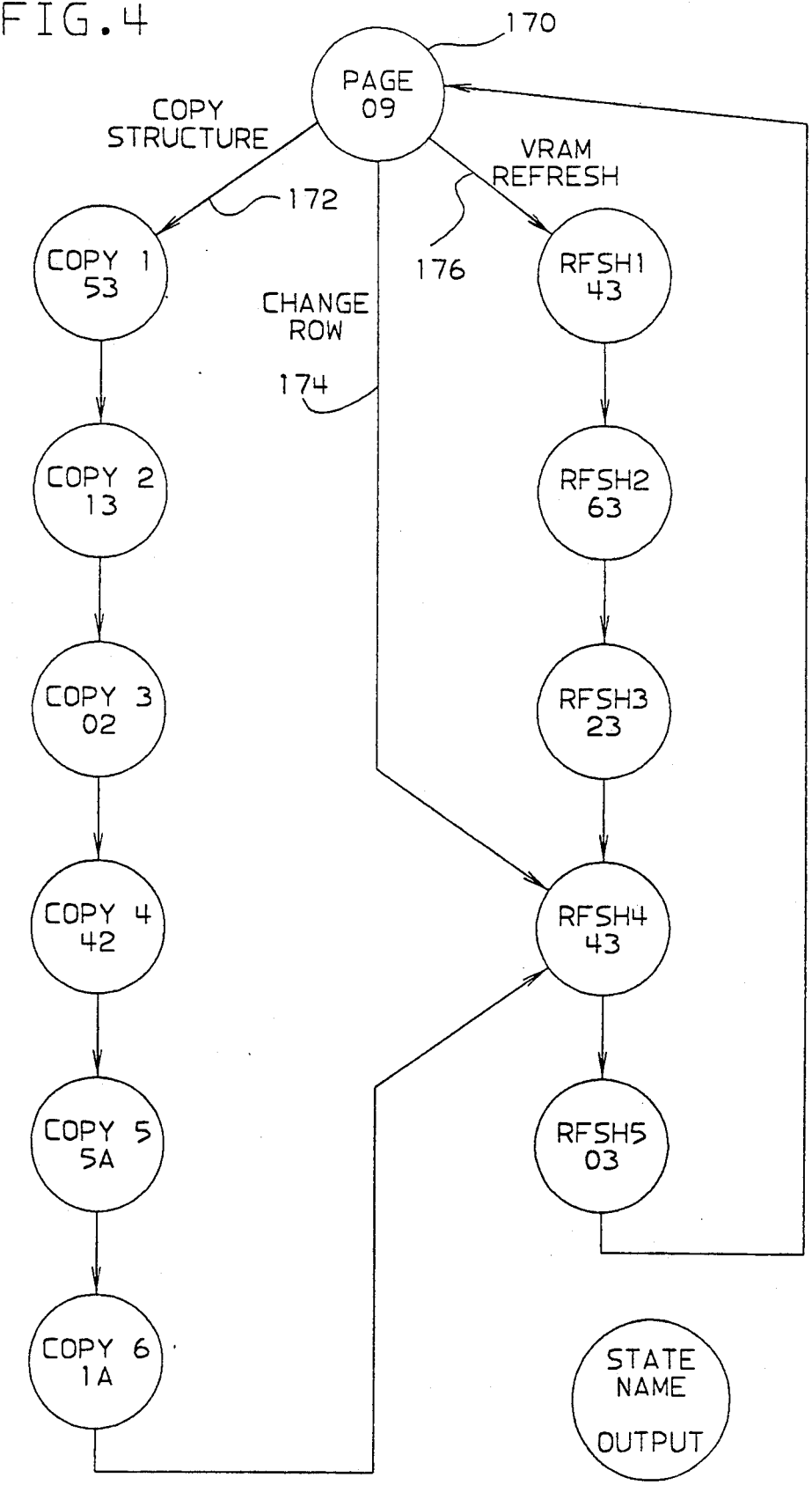
FIG. 4 is a state diagram representing the operation of a VRAM sequencer according to the present invention.

State machine 166 translates the commands into the necessary VRAM control signals, RAS, CAS, OE, WE. The state diagram of state machine 166 is shown in FIG. 4. Each state is shown with a state name and output. In the preferred embodiment, the output comprises seven binary values, expressed in the diagram as a hexadecimal number. The seven outputs are: RAS, CAS, OE, WE, RUN, MUX, REG. The first state, Page 170, has an output of '04' or '0000 0100'B. Thus, all signals are zero except RUN.

The RUN signal indicates the sequencer is active in processing a command sequence. MUX and REG control the multiplexers supplying the address to the video RAMs.

Three sequences are generated by the VRAM controller: COPY STRUCTURE 172, CHANGE ROW 174, and Refresh 176. The refresh sequence is initiated when an internal timer times out and a CAS-before-RAS refresh cycle is begun. The CHANGE ROW sequence takes the VRAMs out of the current page (e.g., row) they are accessing and allows them to access a new row. This cycle is used in setting up memory pointers to the new structure state contained in a VRAM row. The COPY STRUCTURE sequence allows the VRAMs to copy an entire row into a new VRAM row (512 entries). The sequence performs back-to-back Read Data Transfer cycle and Write Data Transfer cycle. These two operations copy the source row into the serial register and then copy the serial register into the destination row.

In the preferred embodiment, VRAM sequencer 160 has been modified to include control logic to perform the combined read data transfer and write data transfer operation in response to a single command. This added control logic accelerates the structure copying process because the operation is performed totally in the hardware. A similar result could be achieved, however, by requiring the graphics processor 150 to issue individual data transfer operation commands to the VRAM sequencer. The implementation in the preferred embodiment reduces the structure state copying time from the 128-256 microseconds required by the graphics copy sequence to 0.8 microseconds by using the preferred embodiment of the present invention.

Completion of the child structure traversal requires that the machine state be returned to the parent structure state. This can be rapidly accomplished by simply reaccessing the parent structure state using the source row register retained in the VRAM sequencer. The addition of appropriate address storage logic associated with the graphics processor will allow the return to any previous structure state in the hierarchy. The manipulation of addresses rather than data transfers greatly speeds the hierarchy traversal process.

I claim:

1. A graphics display system for generating images from hierarchical data structures for display by a display device, said structures including a parent structure and a child structure, said parent structure containing an execute structure command for the execution of said child structure, whereby control passes to said child structure before returning to said parent structure, said system comprising:

means for storing data structures;
  means for processing said data structures to create an image for display by said device, said structures having states associated therewith;
  memory means for storing said structure states, said memory means having a randomly accessed portion divided into rows and columns and a serially accessed portion capable of retaining the contents of one row of said randomly accessed portion, information representing the structure state of said parent structure being stored in a first row of said randomly accessed portion; and
  memory control means responsive to said processing means for controlling said memory means, said memory control means being operable upon the processing of said execute structure command by said processing means to transfer the contents of said first row of said randomly accessed portion to said serially accessed portion and then to transfer the contents of said serially accessed portion to a second row of said randomly accessed portion, whereby said information representing the structure state of said parent structure is copied to said second row for use while executing said child structure while being saved in said first row for use upon the return of control to said parent structure.

2. A method for managing hierarchical data structures in a graphics display system, said structures including a parent structure and a child structure, said parent structure containing an execute structure command for the execution of said child structure, whereby control passes to said child structure before returning to said parent structure, said method comprising the steps of:

(a) processing said parent structure to generate a structure state based upon commands in said parent structure;
  (b) storing said structure state at a first location in a randomly accessed memory having multiple rows;
  (c) detecting said execute structure command while processing said parent structure;
  (d) transferring said structure state from said first location in said randomly accessed memory to a second memory using a first row transfer operation; and
  (e) transferring said structure state from said second memory to a second location in said randomly accessed memory using a second row transfer operation.

3. The method of claim 2 in which the structure state stored at said first location is a first structure state, said method further comprising the steps of:

(f) processing said child structure to generate a second structure state at said second location in said randomly accessed memory based on commands in said child structure; and
  (g) restoring said first structure state upon completion of processing of said child structure.

4. The method of claim 3 in which said child structure contains an execute structure command for the execution of another structure, said method further comprising the steps of:

repeating steps (c) through (f) for each execute structure command processed prior to returning to a previous structure.

5. In a graphic display system in which hierarchical data structures are processed to generate images for display by a display device, said structures including a parent structure and a child structure having structure states associated therewith, said parent structure containing an execute structure command for the execution of said child structure, whereby control passes to said child structure before returning to said parent structure, apparatus for managing said structure states comprising:

memory means for storing said structure states, said memory means having a randomly accessed portion divided into rows and columns and a buffer portion capable of retaining the contents of at least a portion of one row of said randomly accessed portion, information representing the structure state of a parent structure being stored in a first row of said randomly accessed portion; and
  means operable upon the processing of said execute structure command in said parent structure for transferring the contents of said first row of said randomly accessed portion in parallel to said buffer portion and then transferring the contents of said buffer portion in parallel to a second row of said randomly accessed portion, whereby said information representing the structure state of said parent structure is copied to said second row for use while executing said child structure while being saved in said first row for use upon the return of control to said parent structure.

6. Apparatus as in claim 5 in which said memory means comprises a video RAM containing said randomly accessed portion and a serially accessed portion, said serially accessed portion comprising said buffer portion.

* * * * *